United States Patent [19]
Cleobury et al.

[11] 3,777,268
[45] Dec. 4, 1973

[54] DEGRADATION DETECTION IN A PCM SYSTEM

[75] Inventors: Donald Jack Cleobury, Hinckley, England; Bernard Wilson, deceased, late of Conventry, England

[73] Assignee: The General Electric Company Limited, London, England

[22] Filed: Sept. 27, 1971

[21] Appl. No.: 183,770

[30] Foreign Application Priority Data

Sept. 28, 1970 Great Britain .................. 46,059/70

[52] U.S. Cl. .......... 325/38 R, 179/15 AD, 307/235, 328/115, 328/147, 328/148, 325/13, 325/323

[51] Int. Cl. ........................ H03k 9/10, H03k 13/32

[58] Field of Search .................. 325/13, 38, 41, 42, 325/323, 38 B, 328/115, 116, 117, 146–148; 307/235; 340/172, 169; 178/69; 179/15 AE, 15 AD, 15 BA

[56] References Cited

UNITED STATES PATENTS

| | | | |
|---|---|---|---|
| 3,261,919 | 7/1966 | Aaron et al. | 179/15 BA |
| 3,465,253 | 9/1969 | Rittenbach | 325/323 |
| 3,384,711 | 5/1968 | Boxall | 325/13 |
| 3,034,055 | 5/1962 | Fine et al. | 340/172 |

*Primary Examiner*—Robert L. Griffin
*Assistant Examiner*—Marc E. Bookbinder
*Attorney*—Morris Kirschstein et al.

[57] ABSTRACT

An arrangement for detecting the degradation of a received PCM signal before it becomes bad enough to cause serious errors. Ancillary threshold detectors operate at levels on either side of the basic threshold. A falling signal level or rising noise level causes a received pulse to fall in the range between the ancillary levels, producing a warning signal to indicate a degraded signal. As described, the warning signals are integrated over a period of time to produce a time average. The arrangement is useful in repeaters of a radio relay system.

10 Claims, 1 Drawing Figure

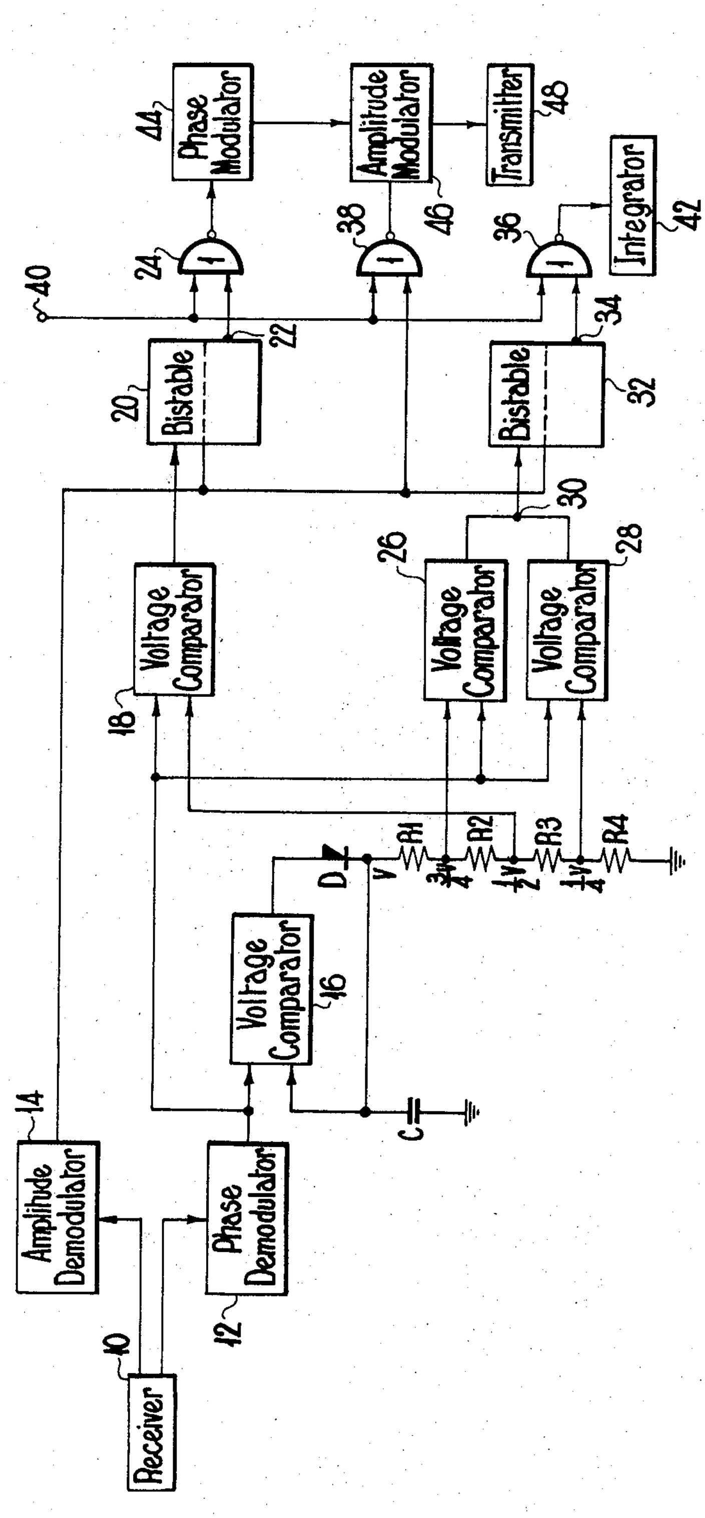
Receiver
Amplitude Demodulator
Phase Demodulator
Voltage Comparator
Bistable
Phase Modulator
Amplitude Modulator
Transmitter
Integrator
R1
R2
R3
R4
D
V
C

DEGRADATION DETECTION IN A PCM SYSTEM

This invention relates to degradation detection in a pulse-code-modulation (P.C.M.) system.

Known methods of error detection in order to produce a warning of signal degradation in a P.C.M. system depend on the use of a repetitive pulse pattern which may either be contained in the message itself or be added by means of pulse stuffing techniques. In either case the test information tends to be intermittent and a comparatively long time is required to establish the error rate, that is, the number of pulses accepted or rejected wrongly per million bits, and therefore a comparatively long time is required to detect degradation of the signal. This is particularly the case with low error rates.

One object of the present invention is to provide a pulse-discriminator arrangement for a P.C.M. system having signal degradation detection means such as to enable a rapid indication of the state of a received signal to be obtained.

According to the present invention a pulse-discriminator arrangement, for use in a P.C.M. system subject to signal fading and/or noise interference, comprises first decision means for producing a decision signal output signifying that an input signal represents a genuine pulse if the level of said input signal is in excess of a first reference level, which first reference is substantially the optimum level for discriminating between signal levels representing genuine and non-genuine pulses, and signal degradation detection means comprising second decision means for producing a warning signal in the event of the level of said input signal falling within a predetermined restricted continuous range of values including said first reference level.

It will be seen that production of a said warning signal is an indication that there is excessive fading in the system, or that the noise level in the system has reached an excessive value, or both, and that therefore the incoming signal is degraded.

Preferably, said warning signals are integrated over a predetermined period of time so as to produce a time-average value for the rate of production of said warning signals.

In a particular arrangement in accordance with the invention, said first reference level lies at the mid-point of said range of values.

The invention also comprehends a P.C.M. system employing a pulse-discriminator arrangement as aforesaid in a repeater, and also the repeater itself including such an arrangement.

One embodiment of the invention will now be described by way of example with reference to the accompanying drawing, which is a schematic block circuit diagram of a repeater for a P.C.M. radio relay system.

The P.C.M. system employs a radio-frequency carrier signal on which a multi-channel P.C.M. signal is imposed by phase modulation, zero phase shift of the carrier representing the binary digit 0 while a phase shift by a predetermined amount represents the binary digit 1.

The code used is of the "non-return-to-zero" type; that is, when two 1 s occur in succession, the phase shift of the carrier is not returned to zero between those digits. With this type of code, if a succession of 1 s or 0 s occurs in the signal the phase of the carrier will remain unchanged for a substantial period and timing information will therefore be lost. A timing marker is therefore imposed on the transmitted signal by amplitude modulation at the bit-rate of the system.

Referring to the drawing, in each repeater of the system the incoming phase-modulated carrier signal is fed to a receiver 10, the output of which is applied to a phase demodulator 12 which produces a voltage output the instantaneous value of which represents the instantaneous carrier phase, and to an amplitude demodulator 14 which extracts the timing signals in the form of voltage spikes at the centre point of each bit of the signal.

The output of the phase demodulator 12 would ideally comprise a sequence of square voltage pulses corresponding to the original P.C.M. signal. However, owing to degradation of the signal in transmission from radio-link noise, intersymbol (i.e. between signal bits) interference, interchannel interference etc., the voltage pulses may be of reduced magnitude and uncertain termination. If the magnitude reduction is excessive, or if the background noise is excessive, there is a risk that pulses will be lost (i.e. not accepted as genuine pulses) or that noise will be accepted as a genuine pulse, resulting in an error in transmission.

The phase demodulator 12 and associated receiver 10 of the repeater include automatic-gain-control and amplitude-limiting features which tend to maintain the voltage pulses from the phase demodulator at a substantially constant level.

The output of the phase demodulator 12 is applied to one input of a voltage comparator 16. The output of the comparator 16 is connected to earth via a diode D and a capacitor C in series. The common point of the diode D and capacitor C is connected to earth via a chain of four equal resistors R1–R4, and is also connected directly to the other input of the comparator 16.

Thus, the voltage level of the phase demodulator output is continuously compared with the voltage across the capacitor C. When this voltage level is lower than the capacitor voltage the output from the comparator 16 is negative and the diode D is reverse-biassed and therefore non-conducting. If, on the other hand, the phase demodulator output voltage rises above the capacitor voltage the output of the comparator 16 becomes positive and the diode D conducts, allowing the capacitor C to be charged further.

The comparator 16 and its associated circuitry thus act as a peak signal detector, producing across the capacitor C a reference voltage level V which is equal to a fairly long-term maximum peak value of the phase-demodulator output signal.

The reference voltage V is divided by the chain of resistors R1–R4 to provide three further reference levels 3V/4, V/2 and V/4. The central level V/2 is the optimum level for discriminating between genuine and non-genuine pulses in the output of the phase demodulator 14. By comparing the phase-demodulated signal with this level, therefore, a binary output is obtained indicative of a pulse present or absent in the original P.C.M. signal prior to modulation of the carrier.

The phase-demodulated signal is compared with the reference level V/2 by means of a voltage comparator 18 which produces at its output a signal representing a binary 1 when the phase-demodulated signal is greater than V/2 and a binary 0 when the signal is smaller than V/2.

The output of the comparator 18 is sampled at the centre of each bit by the timing marker pulses from the amplitude demodulator 14. This sampling is performed by means of a bistable circuit 20 which is arranged to be switched into one or other of its two stable states, depending on the comparator output, but only when triggered by the rising edge of a timing marker pulse.

Thus, if the bistable has a 1 applied to it from the comparator 18 simultaneously with the rising edge of a timing marker pulse, it will be switched into a first state in which a voltage representing a binary 0 appears at the output terminal 22 of the bistable circuit. Correspondingly, if the bistable has a 0 applied to it simultaneously with the rising edge of a timing marker pulse, it will be switched into its other state in which a 1 appears at the output terminal 22.

The output terminal 22 is connected to one input terminal of a two input OR gate 24, the output of which is inverted. Thus, the effect of the OR gate 24 is to invert the signal from the output terminal 22.

The output signal from the OR gate 24 is thus a reconstruction of the original PCM signal in non-return-to-zero form (assuming there are no errors in discriminating between genuine and non-genuine pulses).

The phase-demodulated signal from the demodulator 12 is also applied to the inputs of two further voltage comparators 26 and 28, where it is compared with the reference voltage levels 3V/4 and V/4 respectively. The two comparators 26, 28 are interconnected so as to form a "window comparator", giving a 1 output at their common output terminal 30 if the phase-demodulated signal lies within the "window" between 3V/4 and V/4, and a 0 output at the terminal 30 if the phase-demodulated signal is outside this window.

The output at the terminal 30 is sampled at the centre of each bit by the timing marker pulses, by means of a bistable circuit 32. Thus, if the phase-demodulated signal falls between 3V/4 and V/4 at the instant of sampling, a 0 will appear at the output terminal 34 of the bistable circuit 32. If, on the other hand, the phase-demodulated signal falls outside this window at the instant of sampling, a 1 will appear at the terminal 34.

A 0 appearing at the terminal 34 indicates that the quality of the incoming signal is degraded: either the peak level of the voltage pulses from the phase demodulator has dropped below the level 3V/4, or the noise level has risen above the level V/4. In these circumstances, the possibility of a genuine pulse being wrongly rejected, or of a non-genuine pulse being wrongly accepted, is increased, and therefore the level of confidence in the output of the comparator 18 is reduced.

Viewed in another way, a 0 is produced at the terminal 34 if there is a disparity between the output of the comparator 18 and the output of either of the comparators 26 and 28. Thus, if the level of the phase-demodulated signal (at the instant of sampling) lies between 3V/4 and V/2, the comparator 18 will indicate the presence of a pulse, while the comparator 26 will indicate that there is no pulse; correspondingly, if the level of the phase-demodulated signal (at the instant of sampling) lies between V/2 and V/4 the comparator 18 will indicate no pulse while the comparator 28 will indicate the presence of a pulse.

It will be appreciated that in this particular circuit, disparities between the outputs of the comparator 18 and the comparators 26 and 28 are in fact detected without the necessity for comparing these outputs directly. In a modification of the invention, however, these outputs may be compared directly by means of logic circuitry comprising AND gates and OR gates.

Referring again to the drawing, the output of the bistable circuit 32 is applied to one terminal of a two-input OR gate 36, the output of which is inverted. The OR gate 36 thus inverts the signal from the output terminal 34.

The timing marker pulses from the amplitude demodulator circuit 14 are likewise applied to one input of a further two-input OR gate 38, the output of which is also inverted.

The other input terminals of the three OR gates 24, 36 and 38 are connected to a mute control input terminal 40. When a voltage representing a binary 1 is applied to this mute control input, the outputs from the three OR gates 24, 36, and 38 are all suppressed. Thus, the mute control input 40 provides a means of overriding the outputs of the repeater to clamp these outputs to zero in the event of severe deterioration of the signal.

The output from the OR gate is fed to an integrator 42 which integrates the signals from this gate over a long period of time, typically of the order of 5 minutes. The output of the integrator is thus an indication of the degree of degrdation of the signal, and is applied to an alarm circuit to give an early warning of this degradation before an excessive number of errors are made. Because the output of the OR gate 36 is integrated over a substantial period, however, an occasional momentary degradation of the signal will not have any significant effect; a warning signal will only be produced in the event of a continuing state of degradation.

The output from the OR gate 24 is applied to a phase modulator 44, and is used to phase modulate a carrier wave. The phase-modulated carrier wave is applied to an amplitude modulator 46, where it is amplitude modulated by the timing signals from the OR gate 38, so as to produce the final output signal of the repeater which is fed to a transmitter 48 for transmission to the next stage of the system.

It can be seen that some warning of impending degradation could be obtained from the use of only one of two comparators 26 and 28, by arranging that a warning signal is produced if an input pulse falls in the range between the reference level of that comparator and the reference level V/2 of the main comparator 18. However, clearly the use of both comparators 26 and 28 is preferable. Again the setting of the ancillary threshold levels at the values V/4 and 3V/4 is not essential and it may be found that some variation of these proportions is useful. Again some refinement may be achieved by increasing the number of ancillary levels, to say, four, giving degrees of warning.

Clearly once a warning has been given measures can be taken to switch the particular transmission path out of service, by means of the mute controls.

A detection arrangement such as described above may be included in each repeater of a radio relay system so enabling each link of the system to be checked individually.

The arrangement can be seen to provide a degradation indication from any error pulse without having to determine whether the particular decision is part of a pattern. It then remains only to check for sufficient faults.

We claim:

1. A pulse-discriminator circuit, for use in a P.C.M. system, comprising: means for deriving an input signal from a transmission path; a first output path; means defining a first reference level; and threshold comparator means responsive to said input signal for comparing the amplitude of said input signal with said first reference level to produce an output pulse on said first output path in the event of the amplitude of said input signal exceeding said first reference level; characterized by signal degradation detection means comprising: means for defining second and third reference levels constituting limits of a restricted range of values that includes said first reference level; a second output path; and window comparator means responsive to said input signal for comparing the amplitude of said input signal with said second and third reference levels to produce an output pulse on said second output path if and only if the amplitude of said input signal falls between said second and third reference levels.

2. A circuit according to claim 1 further including: means for deriving periodic timing pulses from said transmission path; first gating means responsive to said timing pulses for permitting a said output pulse from said threshold comparator means to be applied to said first output path only when a said timing pulse is present; and second gating means responsive to said timing pulses for permitting a said output pulse from said window comparator means to be applied to said second output path only when a said timing pulse is present.

3. A circuit according to claim 2 wherein said means for deriving said input signal comprises a phase demodulator means, and said means for deriving said timing pulses comprises an amplitude demodulator means.

4. A circuit according to claim 1 wherein said window comparator means comprises two further threshold comparator means for respectively comparing the amplitude of said input signal with said second and third levels.

5. A circuit according to claim 1 wherein said means for defining said first reference level comprises means responsive to said input signal for detecting a peak value of the amplitude of said input signal, and voltage divider means for producing a reference voltage equal to a predetermined fraction of said peak value.

6. A circuit according to claim 5 wherein said predetermined fraction is one-half.

7. A circuit according to claim 1 wherein said means for defining said second and third reference levels comprises means responsive to said input signal for detecting a peak value of the amplitude of said input signal, and voltage divider means for producing two reference voltages equal to respective predetermined fractions of said peak value.

8. A circuit according to claim 7 wherein said predetermined fractions are one-quarter and three-quarters respectively.

9. A circuit according to claim 1 wherein said signal degradation detection means further includes an integrator means connected to said second output path for producing a time average value for the rate of production of output pulses on said second output path.

10. A circuit according to claim 1 wherein said first reference level lies mid-way between said second and third reference levels.

* * * * *